(12) United States Patent
Wang et al.

(10) Patent No.: US 11,647,471 B2
(45) Date of Patent: May 9, 2023

(54) METHODS AND DEVICES FOR PHYSICAL RANDOM ACCESS CHANNEL POWER CONTROL

(71) Applicant: NEC CORPORATION, Tokyo (JP)

(72) Inventors: Yueyu Wang, Beijing (CN); Zhaobang Miao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/617,215

(22) PCT Filed: Jun. 15, 2017

(86) PCT No.: PCT/CN2017/088377
§ 371 (c)(1),
(2) Date: Nov. 26, 2019

(87) PCT Pub. No.: WO2018/227451
PCT Pub. Date: Dec. 20, 2018

(65) Prior Publication Data
US 2020/0154375 A1 May 14, 2020

(51) Int. Cl.
*H04W 4/00* (2018.01)
*H04W 52/50* (2009.01)
*H04W 52/24* (2009.01)
*H04W 52/40* (2009.01)
*H04W 74/08* (2009.01)

(52) U.S. Cl.
CPC ......... *H04W 52/50* (2013.01); *H04W 52/242* (2013.01); *H04W 52/40* (2013.01); *H04W 74/0833* (2013.01)

(58) Field of Classification Search
CPC ... H04W 52/50; H04W 52/242; H04W 52/40; H04W 74/0833
USPC .................................. 370/329–330, 335–345
See application file for complete search history.

(56) References Cited

U.S. PATENT DOCUMENTS

| 9,635,652 | B2* | 4/2017 | Wu ...................... H04W 52/247 |
| 2010/0285830 | A1* | 11/2010 | Englund ............. H04W 52/146 |
| | | | 455/522 |
| 2011/0159912 | A1* | 6/2011 | Zong ..................... H04W 52/16 |
| | | | 455/522 |

(Continued)

OTHER PUBLICATIONS

"Discussion on RACH Procedure", 3GPP TSG RAN WG1 NR ad hoc Meeting, LG Electronics, R1-1700463, Jan. 16-20, 2017, pp. 1-5.

(Continued)

*Primary Examiner* — Thai D Hoang
(74) *Attorney, Agent, or Firm* — Sughrue Mion, PLLC

(57) ABSTRACT

Embodiments of the present disclosure relate to a method, terminal device and apparatus for physical random access channel (PRACH) power control and a method, network device and apparatus for transmitting parameters of PRACH power control. In an embodiment of the present disclosure, the method of PRACH power control may comprise determining a transmission power of PRACH preamble based on a power constriction of a terminal device, a preamble received target transmission power and a downlink path loss on a beam level. With embodiments of the present disclosure, it could provide a power control for PRACH with improved accuracy, which increases the success possibility of random access attempt and interferences to other devices.

12 Claims, 4 Drawing Sheets

(56) References Cited

U.S. PATENT DOCUMENTS

| | | | | |
|---|---|---|---|---|
| 2014/0126530 A1* | 5/2014 | Siomina | ............... | H04W 52/244 370/330 |
| 2014/0133337 A1* | 5/2014 | Lee | ............... | H04W 52/325 370/252 |
| 2014/0169209 A1* | 6/2014 | Imamura | ............... | H04L 5/0057 370/252 |
| 2014/0169321 A1* | 6/2014 | Imamura | ............... | H04L 5/0035 370/329 |
| 2014/0177584 A1* | 6/2014 | Ouchi | ............... | H04W 52/242 370/329 |
| 2014/0226551 A1* | 8/2014 | Ouchi | ............... | H04W 52/40 370/311 |
| 2014/0247796 A1* | 9/2014 | Ouchi | ............... | H04L 5/0053 370/329 |
| 2015/0016312 A1* | 1/2015 | Li | ............... | H04W 74/006 370/280 |
| 2015/0085787 A1* | 3/2015 | Ouchi | ............... | H04L 5/0037 370/329 |
| 2015/0124673 A1* | 5/2015 | Ouchi | ............... | H04W 52/362 370/311 |
| 2015/0319703 A1* | 11/2015 | Kwon | ............... | H04W 52/50 370/329 |
| 2016/0295609 A1* | 10/2016 | Vajapeyam | ............... | H04W 74/0833 |
| 2017/0055297 A1* | 2/2017 | Da | ............... | H04J 13/0062 |
| 2017/0230843 A1* | 8/2017 | Ouchi | ............... | H04B 7/063 |
| 2017/0230913 A1* | 8/2017 | Ouchi | ............... | H04W 74/0833 |
| 2017/0273056 A1* | 9/2017 | Papasakellariou | .. | H04W 52/143 |
| 2018/0098298 A1* | 4/2018 | Jung | ............... | H04W 48/08 |
| 2018/0235013 A1* | 8/2018 | Jung | ............... | H04W 16/28 |
| 2019/0223157 A1* | 7/2019 | Hwang | ............... | H04L 27/2607 |
| 2019/0394805 A1* | 12/2019 | Kim | ............... | H04W 56/00 |
| 2020/0154375 A1* | 5/2020 | Wang | ............... | H04W 52/242 |
| 2020/0205156 A1* | 6/2020 | Adjakple | ............... | H04W 74/0833 |
| 2020/0236574 A1* | 7/2020 | Ohuchi | ............... | H04B 7/0626 |
| 2020/0275379 A1* | 8/2020 | Sun | ............... | H04W 52/146 |
| 2020/0275479 A1* | 8/2020 | Peisa | ............... | H04W 74/008 |
| 2020/0296765 A1* | 9/2020 | Kim | ............... | H04W 74/0833 |

OTHER PUBLICATIONS

"Discussion on RACH Procedure", 3GPP TSG RAN WG1 Meeting #88bis, LG Electronics, R1-1704869, Apr. 3-7, 2017, pp. 1-7.

"Discussion on RACH Procedure", 3GPP TSG RAN WG1 Meeting #89, LG Electronics, R1-1707594, May 15-19, 2017, pp. 1-11.

"RAN WG's progress on NR technology SI in the January adhoc meeting", 3GPP TSG-RAN WG2 #97, R2-1701059, NTT Docomo, Inc. (Rapporteur), Feb. 13-17, 2017, pp. 1-38.

International Search Report for PCT/CN2017/088377 dated Feb. 24, 2018 [PCT/ISA/210].

Written Opinion for PCT/CN2017/088377 dated Feb. 24, 2018 [PCT/ISA/237].

* cited by examiner

METHODS AND DEVICES FOR PHYSICAL RANDOM ACCESS CHANNEL POWER CONTROL

FIELD OF THE INVENTION

The non-limiting and exemplary embodiments of the present disclosure generally relate to the field of wireless communication techniques, and more particularly relate to a method, terminal device and apparatus for physical random access channel (PRACH) power control and method, network device and apparatus for transmitting parameters for PRACH power control.

BACKGROUND OF THE INVENTION

New radio access system, which is also called as NR system or NR network, is the next generation communication system. In Radio Access Network (RAN) #71 meeting for the third generation Partnership Project (3GPP) working group, study of the NR system was approved. The NR system will consider frequency ranging up to 100 Ghz with an object of a single technical framework addressing all usage scenarios, requirements and deployment scenarios defined in Technical Report TR 38.913, which includes requirements such as enhanced mobile broadband, massive machine-type communications, and ultra-reliable and low latency communications.

In the third generation Partnership Project (3GPP) Long Term Evolution (LTE), a random access process can be used to establish or re-establish a communication connection with the network. In the LTE system, a random access process supports power ramping, wherein the actual PRACH transmission power will be increased gradually for each unsuccessful random access attempt. For example, if a random access attempt fails, the PRACH transmission power for the next attempt can be increased by a step size to increase the likelihood of success in the nest attempt. The power ramping is performed until the random access attempt is successful or the power reaches the top limit of the terminal device.

In the NR system, there is introduced multiple subcarrier spacings, and the terminal device also might change beams during the random access attempts, which means transmission condition during each random access attempts. Thus, in any of these cases, the power control solution in the LTE system will cause a reduced accuracy and thus a reduced access probability, and meanwhile, interferences to other terminal devices might be increased as well.

Therefore, in the art, there is a need of a new PRACH power control solution for the NR system.

SUMMARY OF THE INVENTION

To this end, in the present disclosure, there is provided a new solution for PRACH power control, to mitigate or at least alleviate at least part of the issues in the prior art.

According to a first aspect of the present disclosure, there is provided a method of physical random access channel (PRACH) power control. The method may comprises determining a transmission power of PRACH preamble based on a power constriction of a terminal device, a preamble received target transmission power and a downlink path loss on a beam level.

According to a second aspect of the present disclosure, there is provided a method of transmitting parameters of physical random access channel (PRACH) power control. The method may comprise transmitting configuration parameters for PRACH power control on a beam level.

According to a third aspect of the present disclosure, there is provided a terminal device. The terminal device may comprise a controller is configured to determine a transmission power of a PRACH preamble based on a power constriction of a terminal device, a preamble received target transmission power and a downlink path loss on a beam level.

According to a fourth aspect of the present disclosure, there is provided a network device. The network device may comprise a transceiver configured to transmit configuration parameters for physical random access channel (PRACH) power control on a beam level.

According to a fifth aspect of the present disclosure, there is provided a terminal device. The terminal device may comprise a processor and a memory. The memory may be coupled with the processor and have program codes therein, which, when executed on the processor, cause the terminal device to perform operations of the first aspect.

According to a sixth aspect of the present disclosure, there is provided a network device. The network device may comprise a processor and a memory. The memory may be coupled with the processor and having program codes therein, which, when executed on the processor, cause the network device to perform operations of the second aspect.

According to a seventh aspect of the present disclosure, there is provided a computer-readable storage media with computer program code embodied thereon, the computer program code configured to, when executed, cause an apparatus to perform actions in the method according to any embodiment in the first aspect.

According to an eighth aspect of the present disclosure, there is provided a computer-readable storage media with computer program code embodied thereon, the computer program code configured to, when executed, cause an apparatus to perform actions in the method according to any embodiment in the second aspect.

According to a ninth aspect of the present disclosure, there is provided a computer program product comprising a computer-readable storage media according to the seventh aspect.

According to a tenth aspect of the present disclosure, there is provided a computer program product comprising a computer-readable storage media according to the eighth aspect.

With embodiments of the present disclosure, it could provide a power control for PRACH with improved accuracy, which increases the success possibility of random access attempt and interferences to other devices.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein.

DETAILED DESCRIPTION OF EMBODIMENTS

Figure 1A:
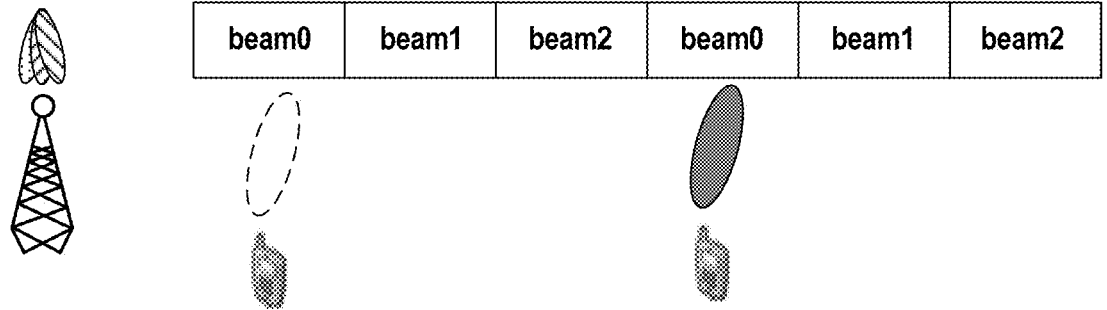
FIGS. 1A to 1B illustrate examples of random access attempts in the prior art.

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, user equipment (UE) may refer to a terminal, a Mobile Terminal (MT), a subscriber station, a portable subscriber station, Mobile Station (MS), or an Access Terminal (AT), and some or all of the functions of the UE, the terminal, the MT, the SS, the portable subscriber station, the MS, or the AT may be included. Furthermore, in the context of the present disclosure, the term "BS" may represent, e.g., a node B (NodeB or NB), an evolved NodeB (eNodeB or eNB), gNB (next generation Node B), a radio header (RH), a remote radio head (RRH), a relay, or a low power node such as a femto, a pico, and so on.

As already mentioned, during the random access attempts, a power ramping is performed and the transmission power will be increased gradually until the random access attempt is successful. The PRACH power is required to set a suitable value, it shall be big enough for UE to make a successful access and on the other hand, it shall keep low to avoid the interference to other devices. A suitable value may be set based on downlink path loss measurement and parameters configured by high layer.

For illustration purposes, the PRACH power control in LTE system is provided as follows:

$$P_{PRACH} = \min\{P_{CMAX,c}(i), \text{PREAMBLE\_RECEIVED\_TARGET\_POWER} + PL_c\}\_[\text{dBm}] \quad \text{(Equation 1)}$$

wherein $P_{PRACH}$ indicates the transmission power of the PRACH preamble; $P_{CMAX,c}(i)$ indicates configured maximum transmit power of the UE for subframe i of the serving cell c and PLc indicates the downlink path loss estimate calculated in the UE for serving cell c; and wherein PREAMBLE_RECEIVED_TARGET_POWER indicate a power determined by the following equation:

$$\text{PREAMBLE\_RECEIVED\_TARGET\_POWER} = \text{preambleInitialReceivedTargetPower} + \text{DELTA\_PREABLE} + (\text{PREAMBLE\_TRANSMISSION\_COUNTER} - 1) * \text{power RampingStep} \quad \text{(Equation 2)}$$

wherein parameters preambleInitialReceivedTargetPower, DELTA_PREABLE, REAMABLE_TRANSMISSION_COUNTER and power RampingStep are configured by the higher layer.

During the random access attempts, the terminal device may change the beam carrying the preamble. For illustration purposes, FIGS. 1A and 1B illustrates examples of random access attempts in the prior art.

Figure 1B:
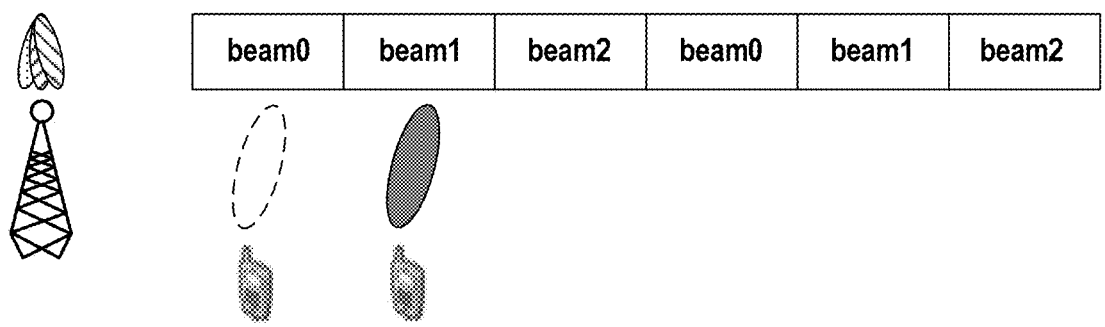

As illustrated in FIG. 1A, if the first random access attempt on beam0 fails, the terminal device may still use beam0 to make a second random access attempts without changing beam. FIG. 1B illustrates a different random access attempt in the prior art. As illustrated in FIG. 1B, if the first random access attempt on beam0 fails, the terminal device may use another beam beam1 to make a second random access attempts instead of continuing to use the previous beam. Thus, it can be seen that, the beam carrying the preamble may be different from the beam on which the path loss is measured. Thus, the power value might be not accurate.

In addition, with the introduction of numerology in NR, the SCS of path loss measurement might be different from the SCS which is used to transmit the preamble. Thus, the power value would be not accurate anymore.

In embodiments of the present disclosure, there is provided a new solution for PRACH power control to mitigate or at least alleviate at least part of the issues in the prior art. Hereinafter, reference will be further made to FIGS. 2 to 6 to describe a PRACH power control as proposed in the present disclosure in details. It shall be appreciated that all embodiments are given for illustrative purposes and the present disclosure is not limited thereto.

Figure 2:
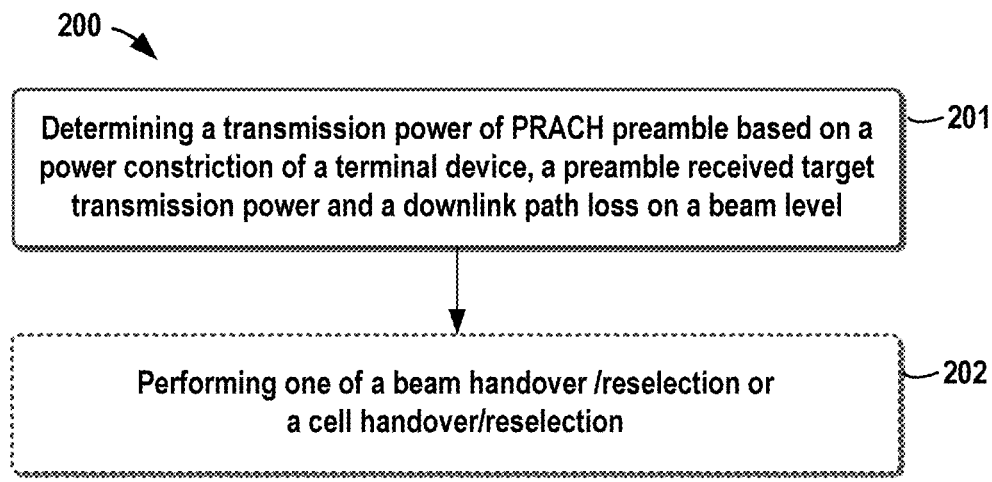
FIG. 2 schematically illustrates a flow chart of a method of PRACH power control at a terminal device according to an embodiment of the present disclosure.

FIG. 2 schematically illustrates a flow chart of a method 200 of PRACH power control at a terminal device according to an embodiment of the present disclosure. The method 200 can be performed at a terminal device, for example UE, or other like terminal devices.

As illustrated in FIG. 2, first in step 201, the terminal device may determine a transmission power of PRACH preamble based on a power constriction of a terminal device, a preamble received target transmission power and a downlink path loss on a beam level. In other words, it is proposed to perform the PRACH power control at the beam level instead of at the cell level. This means that for different beams, it may determine different transmit power and thus the power control accuracy can be improved.

In an embodiment of the present disclosure, at least one of power constriction of the terminal device, a power ramping step for power control, a preamble initial received target power and the downlink path loss can be determined on the beam level.

In an embodiment of the present disclosure, configuration parameters for PRACH power control can be configured for respective beams. In other words, the configurations parameter can be configured at the beam level. The configuration parameters for different beams may be different but they might be identical as well. It is also possible that some of the different beams share same parameter configurations while some of them don't.

In another embodiment of the present disclosure, configuration parameters for PRACH power control can be configured for respective beam groups. The beams can be divided into a plurality of beam group. Beams in the same beam group can share the same parameter configurations but different groups can use different parameter configurations.

In a further embodiment of the present disclosure, configuration parameters for PRACH power control can be configured for beams or transmission reception points (TRP) of quasi-colocation (QCL). Those beams or TRPs have the same channel condition and thus they could share similar parameter configuration.

In a still further embodiment of the present disclosure, the parameter configuration can be set based on property of the beam, such as the channel quality.

In another embodiment of the present disclosure, the parameter configuration may include at least one of power constriction of the terminal device, a power ramping step for power control, an initial received target power.

For illustration purposes, an example power control solution is given as follows:

$$P_{PRACH} = \min\{P_{CMAX,c}(i)^{(j)}, \text{PREAMBLE\_RECEIVED\_TARGET\_POWER}(j) + PL_C(j)\}\_[\text{dBm}] \quad \text{(Equation 3)}$$

wherein PPRACH indicates transmission power of the PRACH preamble; $P_{CMAX,c}(i)^{(j)}$ indicates configured maximum transmit power of the UE for subframe i of beam j in the serving cell c and PLc(j) indicates the downlink path loss estimate calculated in the UE for beam j in serving cell c; and wherein PREAMBLE_RECEIVED_TARGET_POWER(j) indicate a power for beam j determined by:

$$\text{PREAMBLE\_RECEIVED\_TARGET\_POWER}(j) = \quad \text{(Equation 4)}$$
$$preambleInitialReceivedTargetPower(j) +$$
$$\text{DELTA\_PREABLE} +$$
$$(\text{PREAMABLE\_TRANSMISSION\_COUNTER\_1}) *$$
$$\text{power } RampingStep(j).$$

wherein parameters preambleInitialReceivedTargetPower(j) indicates the preamble target power for beam j, initially received from the gNB, DELTA_PREABLE, REAMABLE_TRANSMISSION_COUNTER and power RampingStep(j) are configured by the higher layer; and power RampingStep (j) indicates the power ramping step configured for beam j.

In the present disclosure, alternatively, the PARCH power control can be modified by a SCS adjustment factor to take a change in SCS into consideration. In an embodiment of the present disclosure, the transmission power of PRACH preamble is adjusted by an adjustment factor determined based on information relating to subcarrier spacing for transmitting the PRACH preamble and subcarrier spacing for measuring the downlink path loss. In another embodiment of the present disclosure, at least one of the power ramping step for power control, the delta preamble and the downlink path loss is adjusted by the adjustment factor. The adjustment factor may be a scale factor which is determined based on for example, SCS for preamble transmission and the DL path loss measurement.

For illustration purposes, another example power control solution is given as follows:

$$P_{PRACH} = \min\{P_{CMAX,c}(i), \text{PREAMBLE\_RECEIVED\_TARGET\_POWER} + scalefactor * PL_C\}\_[\text{dBm}] \quad \text{(Equation 5)}$$

wherein PPRACH indicates transmission power of the PRACH preamble; $P_{CMAX,c}(i)$ indicates configured maximum transmit power of the UE for subframe i in the serving cell c and PLc indicates the downlink path loss estimate calculated in the UE for serving cell c; the scalefactor indicates the SCS adjustment factor; and wherein PREAMBLE_RECEIVED_TARGET_POWER indicate a power determined by:

PREAMBLE_RECEIVED_TARGET_
POWER=preambleInitialReceivedTargetPower+
scalefactor*DELTA_PREABLE+(PREAM-
ABLE_TRANSMISSION_
COUNTER−1)*scalefactor*power RampingStep  (Equation 6)

wherein parameters preambleInitialReceivedTargetPower indicates the preamble target power, initially received from the gNB, DELTA_PREABLE, REAMABLE_TRANSMISSION_COUNTER and power RampingStep are configured by the higher layer; and the scalefactor indicates the SCS adjustment factor.

In an embodiment of the present disclosure, The scalefactor can be determined by:

scalefactor=SCS for preamble transmission/SCS for
DL path loss measurement  (Equation 7)

The power spectrum density can implicitly reflect the SCS. In another embodiment of the present disclosure, the information relating the CSC includes the power spectrum density. Thus, the scale factor can be alternatively determined based on the ratio of a power spectrum density of preamble transmission and a power spectrum density of DL path loss measurement.

In another embodiment of the present disclosure, PREAMBLE_RECEIVED_TARGET_POWER can be determined in an equation different from Equation 6. For example, it can be determined by the following equation:

PREAMBLE_RECEIVED_TARGET_
POWER=preambleInitialReceivedTargetPower+
scalefactor*DELTA_PREABLE+(PREAM-
ABLE_TRANSMISSION_COUNTER−1)*
(power RampingStep+scalefactor)  (Equation 8)

In another embodiment of the present disclosure, the PARCH power control can be performed on the beam level and meanwhile modified by a SCS adjustment factor to take a change in SCS into consideration. In an embodiment of the present disclosure, the transmission power of PRACH preamble can be further adjusted by an adjustment factor determined based on information relating a subcarrier spacing for transmitting the PRACH preamble and a subcarrier spacing for measuring the downlink path loss. In another embodiment of the present disclosure, at least one of the power ramping step for power control, a delta preamble and the downlink path loss is further adjusted by the adjustment factor. The adjustment factor may be a scale factor which is determined based on for example, the SCS for preamble transmission and the DL path loss measurement or the power spectrum density thereof.

For illustration purposes, a further example power control solution is given as follows:

$$P_{PRACH} = \min\{P_{CMAX,c}(i)^{(j)}, \text{PREAMBLE\_RECEIVED\_TARGET\_POWER}(j) + \text{Scalefactor}(j) * PL_C(j)\}\_[\text{dBm}] \quad \text{(Equation 9)}$$

wherein PPRACH indicates transmission power of the PRACH preamble; $P_{CMAX,c}(i)^{(j)}$ indicates configured maximum transmit power of the UE for subframe i of beam j in the serving cell c and PLc(j) indicates the downlink path loss estimate calculated in the UE for beam j in serving cell c; the scalefactor (j) indicates the SCS adjustment factor for beam j in the serving cell c; and wherein PREAMBLE_RECEIVED_TARGET_POWER (j) indicate a power determined by:

$$\text{PREAMBLE\_RECEIVED\_TARGET\_POWER}(j) = \text{preambleInitialReceivedTargetPower}(j) + \text{scalefactor}(j) * \text{DELTA\_PREABLE} + (\text{PREAMABLE\_TRANSMISSION\_COUNTER}-1) * \text{scalefactor}(j) * \text{power RampingStep} \quad \text{(Equation 10)}$$

wherein parameters preambleInitialReceivedTargetPower indicates the preamble target power initially received from the gNB, DELTA_PREABLE, REAMABLE_TRANSMISSION_COUNTER and power RampingStep are configured by the higher layer; and the scalefactor (j) indicates the SCS adjustment factor for beam j.

In an embodiment of the present disclosure, the scalefactor (j) can be determined by:

$$\text{scalefactor}(j) = \text{SCS for preamble transmission on beam } j/\text{SCS for DL path loss measurement} \quad \text{(Equation 11)}$$

In another embodiment of the present disclosure, PREAMBLE_RECEIVED_TARGET_POWER can be determined based on different equation from FIG. 10. An example alternative equation is given as follows:

$$\text{PREAMBLE\_RECEIVED\_TARGET\_POWER}(j) = \text{preambleInitialReceivedTargetPower}(j) + \text{scalefactor}(j) * \text{DELTA\_PREABLE} + (\text{PREAMABLE\_TRANSMISSION\_COUNTER}-1) * (\text{power RampingStep}(j) + \text{scalefactor}(j)) \quad \text{(Equation 12)}$$

In embodiments of the present disclosure, the power ramping parameter for power control can be configured by a network and wherein the power ramping parameter can include a preamble initial received target power which can be in a form of any of a relative magnitude or absolute magnitude.

Configuration parameters can be configured by system information on the beam level. In an embodiment of the present disclosure, the power ramping parameter can be notified separately. For illustration purposes, an example power ramping configuration is provided as follows:

EXAMPLE 1 OF POWER RAMPING STEP CONFIGURATION

```
PowerRampingPrarmeterBeam0 :: =    SEQUENCE{
   powerRampingStep                ENUMERATED {dB0, dB2, dB4, dB6}
   preambleInitialReceivedTargetPower    ENUMERATED
      {dBm-120, dBm-118, dBm-116, dBm-114, dBm-112}}
PowerRampingPrarmeterBeam1 :: =    SEQUENCE{
   powerRampingStep                ENUMERATED {dBXX, dBXX, dBXX,
                                               dBXX}
   preambleInitialReceivedTargetPower    ENUMERATED
      {dBmXXX, dBmXXX, dBmXXX, dBmXXX, dBmXXX}}
...                                ...
PowerRampingPrarmeterBeamN :: =    SEQUENCE{
   powerRampingStep                ENUMERATED {dBXX, dBXX, dBXX,
                                               dBXX}
   preambleInitialReceivedTargetPower    ENUMERATED
      {dBmXXX, dBmXXX, dBmXXX, dBmXXX, dBmXXX} }
``` wherein configurations for beams 1 to N are newly added contents and those underlined shows the parameters for different beams can be different. In these configurations, the preamble initial received target power is in a unit of dBm and thus, it is an absolute magnitude.

In another embodiment of the present of the present disclosure, the power ramping parameter can be notified dependently and the preamble initial received target power can be a relative magnitude. For illustration purposes, an example power ramping configuration is provided as follows:

EXAMPLE 2 OF POWER RAMPING STEP CONFIGURATION

```
PowerRampingPrarmeterBeam0 :: =    SEQUENCE{
   powerRampingStep                ENUMERATED {dB0, dB2, dB4, dB6}
   preambleInitialReceivedTargetPower    ENUMERATED
      {dBm-120, dBm-118, dBm-116, dBm-114, dBm-112}}
PowerRampingPrarmeterBeam1 :: =    SEQUENCE{
   powerRampingStep                ENUMERATED {dBXX, dBXX, dBXX,
                                               dBXX}
```

```
    preambleInitialReceivedTargetPower    ENUMERATED
{dB XXX, dB XXX, dB XXX, dB XXX, dB XXX}}
...                                       ...
PowerRampingPrarmeterBeamN :: =    SEQUENCE{
    powerRampingStep                ENUMERATED {dBXX, dBXX, dBXX,
                                    dBXX}
    preambleInitialReceivedTargetPower    ENUMERATED
{dB XXX, dB XXX, dB XXX, dB XXX, dB XXX}}
``` wherein configurations for beams 1 to N are newly added contents and those underlined shows the parameters for different beams can be different. In these configurations, the preamble initial received target power is in a unit of dB and thus, it is a relative magnitude.

In another embodiment of the present of the present disclosure, all beams share the same power ramping configuration sets. For example for those beams of QCL or those in one cell shall the same power ramping configuration sets. For illustration purposes, an example power ramping configuration is provided as follows:

EXAMPLE 3 OF POWER RAMPING STEP CONFIGURATION

```
PowerRampingPrarmeterBeam0--N :: =    SEQUENCE{
    powerRampingStep                ENUMERATED {dB0, dB2, dB4, dB6}
    preambleInitialReceivedTargetPower    ENUMERATED
{dBm-120, dBm-118, dBm-116, dBm-114, dBm-112}}
``` wherein configurations for beams 1 to N are newly added contents and all the beams share the same configurations.

In the present disclosure, there is further provided a solution of UE behavior when the transmission power reaches the maximum value.

In an embodiment of the present disclosure, the UE is in an idle status and in such a case, if the transmission power reaches the maximum power limit, the UE may perform a beam reselection or a cell reselection. Preferably, the cell reselection is performed after a PRACH preamble transmission fails on one or more beams changed by performing the beam reselection.

In an embodiment of the present disclosure, the UE is in a connected status and in such a case, if the transmission power reaches the maximum power limit, the UE may perform a beam handover or a cell handover. Preferably, the cell handover is performed after a PRACH preamble transmission fails on one or more beams changed by performing the beam handover.

In an embodiment of the present disclosure, in response to the transmission power reaching the power constriction of the terminal device, the terminal device may perform one of: a beam handover/reselection; or a cell handover/reselection, as illustrated in step 402 of FIG. 1.

Figure 3:
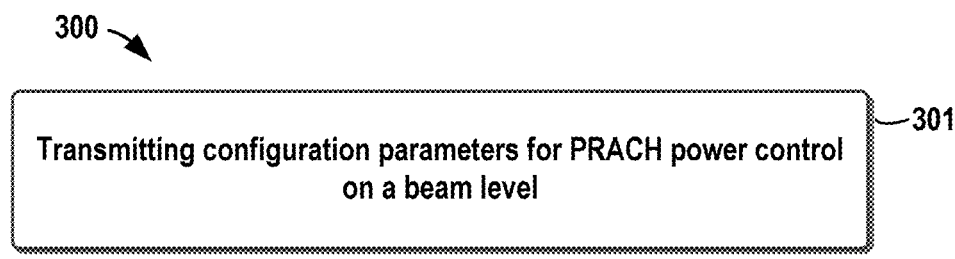
FIG. 3 illustrates a flow chart of a method of transmitting parameters of PRACH power control at a network device according to an embodiment of the present disclosure.

FIG. 3 illustrates a flow chart of a method of transmitting PRACH at a network device according to an embodiment of the present disclosure. The method 300 can be performed at a network device like gNB.

As illustrated in FIG. 3, the gNB may transmit configuration parameters for PRACH power control on a beam level in step 301. In other words, the gNB may configure the parameters for PRACH power control on a beam level. In an embodiment of the present disclosure, the configuration parameters may comprise at least one of a power ramping step for power control, and a preamble initial received target power.

Examples of the parameters configuration can be seen in examples 1 to 3 of power ramping parameter configuration described hereinabove and detailed description will not be elaborated herein.

Figure 4:
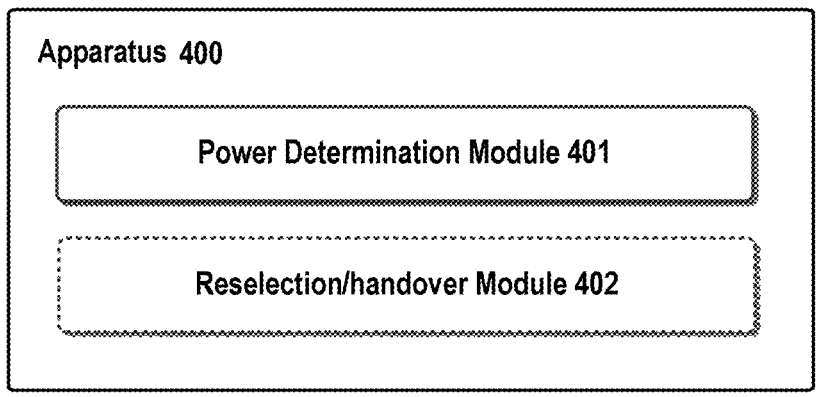
FIG. 4 illustrates an apparatus for PRACH power control at a terminal device according to an embodiment of the present disclosure.

FIG. 4 illustrates an apparatus for PRACH power control at a terminal device according to an embodiment of the present disclosure. Apparatus 400 can be implemented at a terminal device such as UE.

As illustrated in FIG. 4, apparatus 400 may comprise a power determination module 401, which can be configured to determine a transmission power of PRACH preamble based on a power constriction of a terminal device, a preamble received target transmission power and a downlink path loss on a beam level.

In an embodiment of the present disclosure, at least one of power constriction of the terminal device, a power ramping step for power control, a preamble initial received target power and the downlink path loss can be determined on the beam level.

In another embodiment of the present disclosure, the transmission power of PRACH preamble can be further adjusted by an adjustment factor determined based on information relating to subcarrier spacing for transmitting the PRACH preamble and subcarrier spacing for measuring the downlink path loss.

In a further embodiment of the present disclosure, at least one of the power ramping step for power control, a delta preamble, and the downlink path loss can be further adjusted by the adjustment factor.

In a still further embodiment of the present disclosure, a power ramping parameter for power control can be configured by a network and wherein the power ramping parameter include a preamble initial received target power which is in a form of any of a relative magnitude or absolute magnitude.

In a yet further embodiment of the present disclosure, apparatus 400 may further comprise a handover/reselection module 402, which could be configured to perform, in response to the transmission power reaching the power constriction of the terminal device, one of a beam handover/reselection or a cell handover/reselection.

In a still yet further embodiment of the present disclosure, the cell handover/reselection can be performed after a PRACH preamble transmission fails on one or more beams changed by performing the beam handover/reselection.

In a yet still further embodiment of the present disclosure, configuration parameters for PRACH power control can be configured for at least one of respective beams; respective beam groups; and beams or transmission reception points of quasi-colocation.

Figure 5:
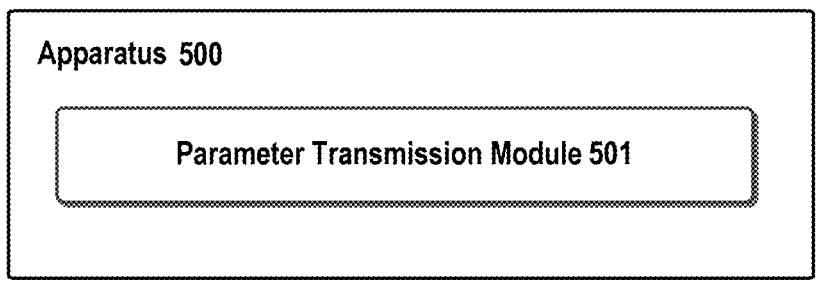
FIG. 5 illustrates an apparatus for transmitting parameters of PRACH power control at a network device according to an embodiment of the present disclosure.

FIG. 5 illustrates an apparatus for transmitting parameters of PRACH power control at a network device according to an embodiment of the present disclosure. Apparatus 500 can be implemented at a network device such as gNB.

As illustrated in FIG. 5, apparatus 500 may comprise a parameter transmission module 501, which can be configured to transmit configuration parameters for physical random access channel (PRACH) power control on a beam level. In other words, the gNB may configure the parameters for PRACH power control on a beam level. In an embodiment of the present disclosure, the configuration parameters may comprise at least one of a power ramping step for power control, and a preamble initial received target power.

Hereinbefore, apparatuses 400 and 500 are described with reference to FIGS. 4 and 5 in brief. It is noted that the apparatuses 400 and 500 may be configured to implement functionalities as described with reference to FIGS. 2 to 3. Therefore, for details about the operations of modules in these apparatuses, one may refer to those descriptions made with respect to the respective steps of the methods with reference to FIGS. 2 to 3.

It is further noted that components of the apparatuses 400 and 500 may be embodied in hardware, software, firmware, and/or any combination thereof. For example, the components of apparatuses 400 and 500 may be respectively implemented by a circuit, a processor or any other appropriate selection device.

Those skilled in the art will appreciate that the aforesaid examples are only for illustration not limitation and the present disclosure is not limited thereto; one can readily conceive many variations, additions, deletions and modifications from the teaching provided herein and all these variations, additions, deletions and modifications fall the protection scope of the present disclosure.

In addition, in some embodiment of the present disclosure, apparatuses 400 and 500 may comprise at least one processor. The at least one processor suitable for use with embodiments of the present disclosure may include, by way of example, both general and special purpose processors already known or developed in the future. Apparatuses 400 and 500 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 400 and 500 to at least perform operations according to the method as discussed with reference to FIGS. 2 to 3 respectively.

Figure 6:
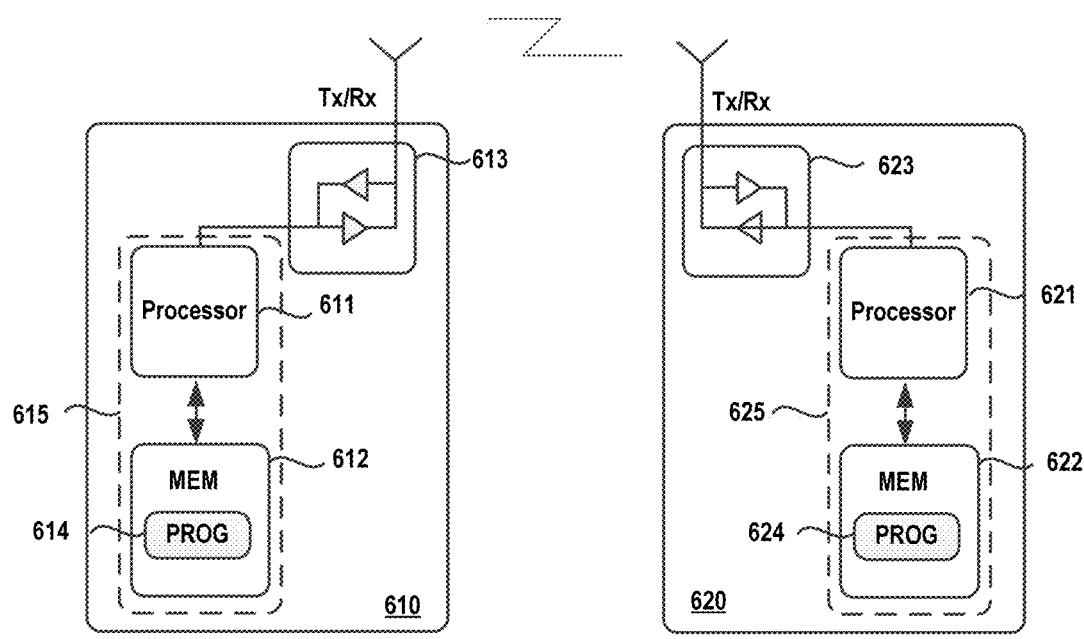
FIG. 6 further illustrates a simplified block diagram of an apparatus 610 that may be embodied as or comprised in a network device ((like gNB), and an apparatus 620 that may be embodied as or comprised in a terminal device like UE as described herein.

FIG. 6 further illustrates a simplified block diagram of an apparatus 610 that may be embodied as or comprised in a network device like a base station in a wireless network and an apparatus 620 that may be embodied as or comprised in a terminal device like UE as described herein.

The apparatus 610 comprises at least one processor 611, such as a data processor (DP) and at least one memory (MEM) 612 coupled to the processor 611. The apparatus 610 may further comprise a transmitter TX and receiver RX 613 coupled to the processor 611, which may be operable to communicatively connect to the apparatus 620. The MEM 612 stores a program (PROG) 614. The PROG 614 may include instructions that, when executed on the associated processor 611, enable the apparatus 610 to operate in accordance with embodiments of the present disclosure, for example the method 300. A combination of the at least one processor 611 and the at least one MEM 612 may form processing means 615 adapted to implement various embodiments of the present disclosure.

The apparatus 620 comprises at least one processor 621, such as a DP, and at least one MEM 622 coupled to the processor 621. The apparatus 620 may further comprise a suitable TX/RX 623 coupled to the processor 621, which may be operable for wireless communication with the apparatus 610. The MEM 622 stores a PROG 624. The PROG 624 may include instructions that, when executed on the associated processor 621, enable the apparatus 620 to operate in accordance with the embodiments of the present disclosure, for example to perform the method 200. A combination of the at least one processor 621 and the at least one MEM 622 may form processing means 625 adapted to implement various embodiments of the present disclosure.

Various embodiments of the present disclosure may be implemented by computer program executable by one or more of the processors 611, 621, software, firmware, hardware or in a combination thereof.

The MEMs 612 and 622 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 611 and 621 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disc or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a terminal device, the method comprising:
   receiving, from a network device, a configuration parameter for a PRACH transmission;
   determining information related to a subcarrier spacing for the PRACH transmission based on the configuration parameter and a downlink path loss measurement;
   determining a transmission power for a physical random access channel (PRACH) based on the configuration parameter, and a downlink path loss, wherein the downlink path loss is obtained based on channel information; and
   transmitting the PRACH based on the transmission power,
   wherein at least one of a maximum output power of the terminal device, a power ramping step for power control, a preamble initial received target power and the downlink path loss is determined on a channel level,
   wherein the preamble initial received target power includes an initial received target power per channel, and the initial received target power per channel is based on a preamble target power for a first channel indicated by the network device, and
   wherein the network device is a gNB and the preamble target power for the first channel is indicated by the gNB in system information.

2. The method of claim 1, further comprising:
   determining, the power for the PRACH transmission based on the downlink path loss measurement and the subcarrier spacing of the PRACH transmission.

3. The method of claim 1, wherein the configuration parameter includes the power ramping step and/or the preamble initial received target power.

4. The method of claim 1, wherein the subcarrier spacing of the PRACH transmission is a first subcarrier spacing, the downlink path loss measurement is associated with a second subcarrier spacing, and the power for the PRACH transmission is further based on a ratio of the first subcarrier spacing to the second subcarrier spacing.

5. A terminal device comprising:
   a memory storing instructions; and
   one or more processors, the one or more processors configured to execute the instructions to cause the terminal device to:
   receive from a network device, a configuration parameter for a PRACH transmission,
   determine first information related to a subcarrier spacing for the PRACH transmission based on a downlink path loss measurement,
   determine second information based on the configuration parameter and the first information,
   determine a transmission power for a physical random access channel (PRACH) based on the first information, the second information and the downlink path loss measurement, wherein the downlink path loss measurement is obtained based on channel information, and
   transmit the PRACH based on the transmission power,
   wherein at least one of a maximum output power of the terminal device, a power ramping step for power control, a preamble initial received target power and the downlink path loss measurement is determined on a channel level,
   wherein the preamble initial received target power includes an initial received target power per channel, and the initial received target power per channel is based on a preamble target power for a first channel indicated by the network device, and
   wherein the network device is a gNB and the preamble target power for the first channel is indicated by the gNB in system information.

6. The terminal device of claim 5, wherein the one or more processors are further configured to execute the instructions to cause the terminal device to determine the power for the PRACH transmission based on the downlink path loss measurement and the subcarrier spacing of the PRACH transmission.

7. The terminal device of claim 5, wherein the configuration parameter includes the power ramping step and/or the preamble initial received target power.

8. The terminal device of claim 5, wherein the subcarrier spacing of the PRACH transmission is a first subcarrier spacing, the downlink path loss measurement is associated with a second subcarrier spacing, and the power for the PRACH transmission is further based on a ratio of the first subcarrier spacing to the second subcarrier spacing.

9. A method performed by a network device, the method comprising:
- transmitting, to a terminal device, a configuration parameter for a PRACH transmission;
- wherein the terminal device is configured to:
  - determine information related to a subcarrier spacing for the PRACH transmission based on the configuration parameter and a downlink path loss measurement, and
  - determine a transmission power for a physical random access channel (PRACH) based on the configuration parameter, and a downlink path loss, wherein the downlink path loss is obtained based on a channel information; and
- receiving, from the terminal device, a PRACH based on the transmission power,
- wherein at least one of a maximum output power of the terminal device, a power ramping step for power control, a preamble initial received target power and the downlink path loss is determined on a channel level,
- wherein the preamble initial received target power includes an initial received target power per channel, and the initial received target power per channel is based on a preamble target power for a first channel indicated by the network device, and
- wherein the network device is a gNB and the preamble target power for the first channel is indicated by the gNB in system information.

10. The method of claim 9, wherein the terminal device is further determines the power for the PRACH transmission based on the downlink path loss measurement and the subcarrier spacing of the PRACH transmission.

11. The method of claim 9, wherein the configuration parameter includes the power ramping step and/or the preamble initial received target power.

12. The method of claim 9, wherein the subcarrier spacing of the PRACH transmission is a first subcarrier spacing, the downlink path loss measurement is associated with a second subcarrier spacing, and the power for the PRACH transmission is further based on a ratio of the first subcarrier spacing to the second subcarrier spacing.

* * * * *